United States Patent [19]

Artman

[11] Patent Number: 4,465,032

[45] Date of Patent: Aug. 14, 1984

[54] PRECOMBUSTION CHAMBER FOR INTERNAL COMBUSTION ENGINE

[76] Inventor: Noel G. Artman, 15830 Nicklaus La., Sun City, Ariz. 85351

[21] Appl. No.: 456,881

[22] Filed: Jan. 10, 1983

[51] Int. Cl.³ .............................................. F02B 31/00
[52] U.S. Cl. .................... 123/263; 123/281; 123/282; 123/285; 123/290; 123/293
[58] Field of Search ............... 123/263, 281, 282, 283, 123/284, 285, 290, 292, 293

[56] References Cited

U.S. PATENT DOCUMENTS

| | | | |
|---|---|---|---|
| 1,540,458 | 6/1925 | Burtnett | 123/281 |
| 1,750,063 | 3/1930 | Sorg | 123/263 |
| 2,012,086 | 8/1935 | Mock | 123/263 |
| 2,223,090 | 11/1940 | Boxan . | |
| 2,855,908 | 10/1958 | Pflaum . | |
| 2,884,913 | 5/1959 | Heintz . | |
| 3,102,521 | 9/1963 | Slemmons . | |
| 3,443,552 | 5/1969 | von Seggern . | |
| 4,000,722 | 1/1977 | May | 123/281 |
| 4,320,728 | 3/1982 | Artman . | |

FOREIGN PATENT DOCUMENTS 2715943 10/1978 Fed. Rep. of Germany .... 123/32 C
0448554 6/1936 United Kingdom ................ 123/263

Primary Examiner—Parshotam S. Lall

[57] ABSTRACT

Internal combustion reciprocating-piston engine precombustion chamber in which a mass of air or air mixed with selective amounts of fuel and a spark-ignitable air-fuel mass are segregatively compressed with the latter mass enveloping spark electrodes preparatory to ignition. The chamber is provided by recessing the air intake valve of an engine cylinder into the cylinder head so that this chamber forms a section of the main air intake passage for the cylinder. Air deflecting means is provided in a vestibule of the chamber in a manner to create a vortex of air forced from the cylinder through the vestibule internally of the chamber pursuant to the compression stroke of the cylinder's piston, and, without incurring significant resistance to the flow of air delivered through the air intake passage into the cylinder pursuant to the preceding air intake stroke of the piston.

28 Claims, 3 Drawing Figures

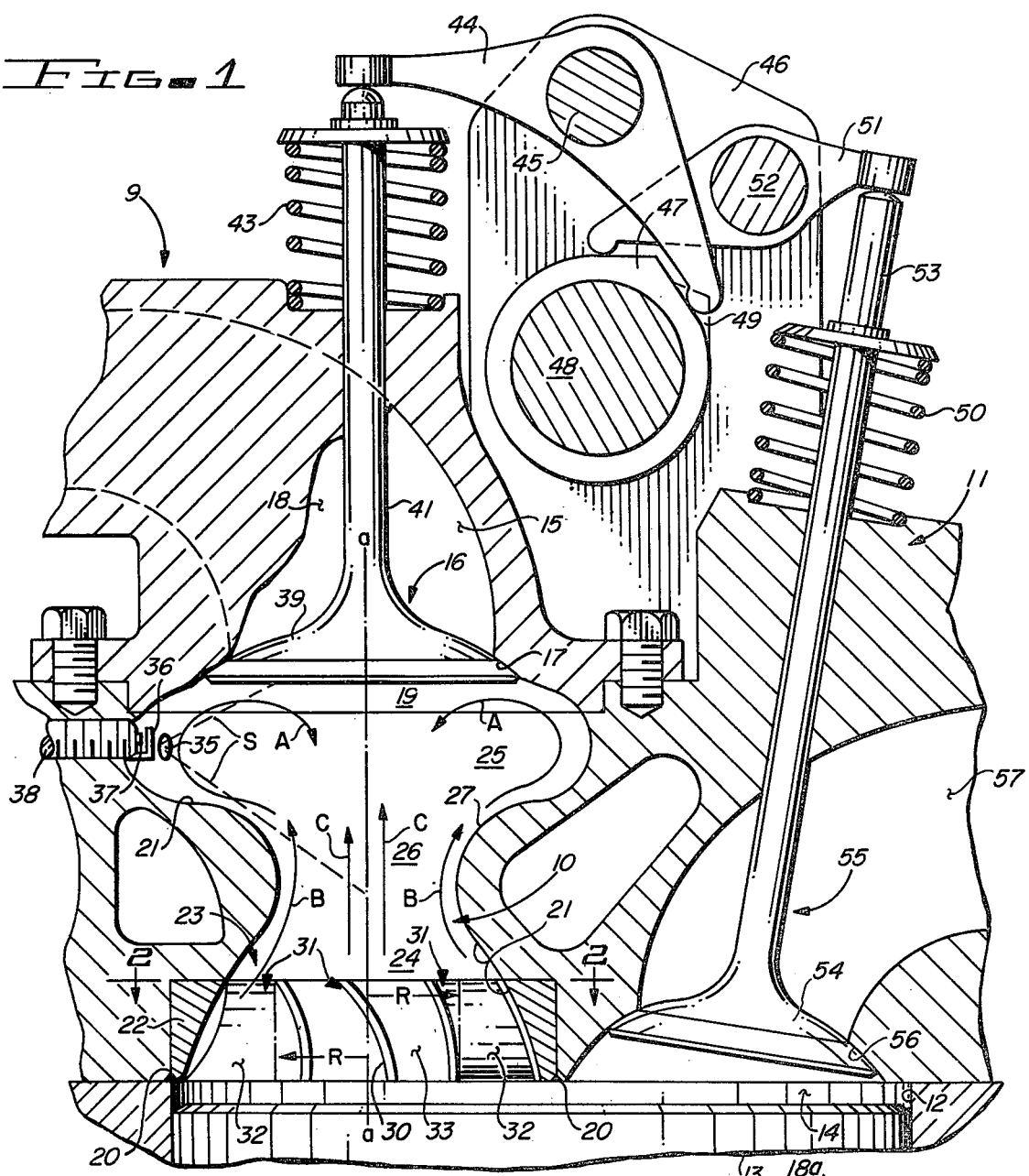

PRECOMBUSTION CHAMBER FOR INTERNAL COMBUSTION ENGINE

SUMMARY OF THE INVENTION

This invention relates to internal combustion engines of the type wherein combustion is initiated in a combustion chamber auxiliary to and communicative with a variable volume space generally corresponding to what is commonly termed the combustion chamber of an orthodox Otto or four-stroke-cycle engine. The invention particularly concerns improvements in the construction and arrangement of parts of the auxiliary chamber that control the flow of air from the variable volume space into and within the chamber. This control is in a manner that causes rotation of the chamber-contained air about an axis of such chamber and arrangement of such rotating air into discrete rotating masses occupying respective adjacent positions along said axis. This control of the air makes it possible to mix fuel with one of these masses exclusively of or in greater amount than in the other to create with the one mass an ideal spark-ignitable air-fuel mixture, whereby ensuing combustion occurs more completely in an excess of oxygen existing in the other air mass and with less fuel to produce a given amount of energy under engine idle and part load conditions than if all of the air had received enough fuel to dependably spark-ignite. In this manner the invention provides for not only an improved fuel consumption characteristic but also for diminution of exhaust gas pollutants. Both air masses are mixable with combustion-sustaining quantities of fuel varying in amount to attain desired engine speed and power.

The species of structure herein disclosed involves improvements upon the structures disclosed in my pending application for U.S. patent filed Oct. 14, 1982, Ser. No. 434,295 for Combined Air Intake Passage and Precombustion Chamber for Internal Combustion Engine. The improvements relate to the internal contour of the chamber and the arrangement in a vestibule thereof of an air flow control means which imparts spiral motion to air or gas flowing through the vestibule without imposing significant resistance to such flow either into or from the chamber.

DESCRIPTION OF DRAWING FIGURES

FIG. 1 is a fragmentary view taken sectionally through the cylinder head and upper part of an engine cylinder, illustrating a precombustion chamber structure embodying a preferred form of this invention.

FIG. 2 is a plan view of the air flow control unit of the chamber, taken as indicated by the line 2—2 and associated arrows in FIG. 1.

FIG. 3 is a fragmentary sectional view illustrating precombustion chambers with modified interior peripheral contours.

DESCRIPTION AND EXPLANATION OF THE ILLUSTRATED FORMS OF THE INVENTION

A precombustion chamber structure 10 embodying a preferred form of the invention is shown in FIG. 1 in the cylinder head 11 of a cylinder 12 which are parts of a 4-stroke cycle internal combustion engine 9. A piston 13 reciprocates conventionally in the cylinder pursuant to varying the volume of a variable volume space 14 in the cylinder between the piston and the cylinder head. Air inlet passage 15 communicating with the variable volume space contains an air inlet valve 16 of the poppet type having an annular seat 17 disposed between an upstream portion 18 of such passage and the precombustion chamber 10 which constitutes an open center section of such passage contiguous with and communication endwise through the lower face of the cylinder head with the variable volume space. Thus the precombustion chamber is interposed serially between the variable space and an upstream portion of the air inlet passage.

The chamber 10 has a principal axis a—a extending between opposite ends thereof and of which ends one, designated 19, is an air inlet end communicative with the upstream passage portion through the valve seat 17 which surrounds the axis a—a. The other end of the chamber, the lower end as viewed in FIG. 1, is an open end in juxtaposed open communication with the variable volume space 14. The chamber has an inwardly-facing periphery 21 surrounding the axis a—a. Part of such periphery 21 is borne by a ring 22 which is inset firmly into the lower face of cylinder head 11. The ring, which constitutes an element of air flow control means 23, may be secured in place by weldments 20. That part of the inwardly-facing periphery 21 borne in part by the ring 22 and extending therefrom upwardly to a throat 26 of the hourglass-like interior of the chamber embraces a chamber vestibule 24, the throat providing a juncture between a main chamber portion 25 and the vestibule of the chamber. The main chamber portion 25 of bulbous shape disposed adjacently to the air inlet end of the chamber has a radially inwardly-facing periphery with a section of maxim girth about axis a—a in excess of such girth of the valve seat 17 and of the girth of the radially inwardly-facing periphery of the throat portion 26. Main chamber portion 25 terminates at its lower end with a portion 27 of its radially inwardly-facing periphery axially spaced from the chamber air inlet end and convergent away from such end toward the axis a—a. Or, stated differently, the inwardly-facing periphery of the main chamber portion is contractively convergent axially from the maximum girth section thereof to the juncture between such main chamber portion and the vestibule 24, thus providing a peripheral contour imposing minimal resistance to the interflow of air or gas between the main and vestibule portions of the chamber. Similarly, a portion of the vestibule inwardly-facing periphery adjacently to the throat portion 26 is convergent, upwardly as viewed in FIG. 1, to said throat portion and toward said axis.

Air deflecting vanes 31 constituting a species of air deflecting means disposed within the vestibule 24 are operable cooperably with the periphery 21 to cause air entering the chamber 10 from the variable volume space 14 to flow helically upwardly about the axis a—a. These vanes which are supported by the ring 22 project in cantilever fashion into an annular space disposed between the vestibule portion or periphery 21 and a cylindrical unobstructed central space 33 contiguously enveloping axis a—a and represented by radius lines R and a circular dot-dash line coinciding with the radially inner edges of vanes 31. This central space accommodates substantially unobstructed flow of air or gas therethrough, via the chamber open end, between the variable volume space and the chamber main portion. The vanes 31 which are spaced apart circumferentially about axis a—a are disposed to slant air deflecting surfaces 30 thereof in the same direction helically about such axis. The chamber periphery 21 cooperates with the vane deflecting surfaces 30 by containing and thus restraining the deflected air against radial outward flow under the influence of centrifugal force.

A diagramatically illustrated fuel injection nozzle 35 is adapted to inject an evaporative fuel such as gasoline into the chamber 10. A typical conical spary pattern for such injected fuel is represented by the dash lines S. This fuel is mixed with air in chamber 10 to form a spark-ignitable air-fuel mixture ignitable by spark occurring between electrodes 36 and 37 of a spark plug 38. The spark plug and nozzle are both shown slightly out of their actual positions angularly about the chamber axis to accommodate both being illustrated in the single drawing view. In reality both would be nearer to the viewer which would place the spark plug out of view on the viewer's side of the drawing plane and the nozzle in a position to be obscured by the spark plug if it were shown in such position.

Poppet valve 16 has a head 39 on a valve stem 41 and which is typically unseated from the valve seat 17 by a downward thrust on stem 41 against the force of a spring 43. This down thrust is provided through a rocker arm 44 pivoting on a bearing 45 supported by a bracket 46 mounted on the cylinder head. A cam 47 rotatable with an overhead cam shaft 48 pivots the rocker arm to operate the valve 16 in timed relation with the engine crankshaft, not shown, the camshaft being driven by the crankshaft in any orthodox fashion. A second cam 49 on the camshaft pivots a rocker arm 51 on its bearing 52 to thrust an exhaust valve stem 53 downwardly against the force of a spring 50 to unseat the head 54 of exhaust valve 55 from its seat 56 and establish communication of variable volume space 14 with an exhaust passage 57.

Operation of the engine with the above-described precombustion chamber is as follows: Starting with the downward air-intake stroke of piston 13 of this 4-stroke cycle engine, air is drawn inwardly through the upstream portion 18 of the air-intake passage 15 past the then open intake valve 16 and through the precombustion chamber 10 into the variable volume space 14 while the exhaust valve 55 is closed. Normal exhaust contaminants such as incompletely oxidized hydrocarbons retained in the chamber, during the preceding exhaust stroke of the piston, are swept from the chamber with the intake air into the variable volume space where they are dispersed within this air.

During the ensuing compression stroke of the piston, while the intake and exhaust valves are both closed, the air is forced from this contracting space past the air deflector vanes 31 further into the precombustion chamber. That part of the air stream entering the chamber within the annular space 32, FIG. 2, and between the vanes 31, is a peripheral portion of such stream contactively surrounding the central portion thereof in the space 33 and is deflected by such vanes to spin helically about axis a—a while advancing further into the chamber. Said central portion of the air stream entering the chamber within the cylindrical central space 33 of radius R, as illustrated in both FIGS. 1 and 2, is engaged by the helically spinning peripheral air portion which is forced radially inwardly thereagainst by the vestibule periphery portion which converges upwardly to the throat 26 and toward the axis a—a. In this manner the helically spinning air imparts spinning motion to the air entering through the central space 33 so that the entire air mass passing upwardly through the throat is in the form of a rising vortex. The radially outer portion of this vortex flows contiguously to the inwardly-facing curved peripheries of throat 26 and of the main chamber portion 25 as illustrated by arrows B and A. This is a phenomenon known as the Coanda effect which is defined in the Third Edition of Van Nostrand's Scientific Encyclopedia as follows: "The tendency of a jet of gas to follow the wall contour when discharged adjacent to a surface even when that surface curves away from the jet discharge axis is known as the Coanda effect". Because of this tendency of the radially outer portion of the vortex to follow the hourglass-like periphery 21 of the chamber, that part of the upwardly advancing vortex adjacently to the inwardly-facing periphery of chamber portion 25, upon reaching the upper end of the chamber, will be deflected thereby downwardly contiguously about the chamber axis in the form of a reflux vortex as illustrated by the arrows A. This character of air flow in a precombustion chamber is explained in German Pat. No. 2715943 issued to Robert Bosch GmBH. Downward flow of the reflux vortex illustrated by arrows A is opposed by the center portion of the vortex flowing upwardly through the throat 26 as illustrated by the arrows C, thus preventing reentry of air into the throat from the chamber portion 25.

Because of this vortex flow control, downward movement of all parts of air initially in the upper chamber portion 25 at the beginning of the compression stroke as well as air entering this chamber portion during the compression stroke is effectively opposed by portions or vortex air successively following upwardly into this chamber portion, wherefore the air so initially in this bulbous chamber portion, and fuel mixed therewith at a time later described to form therewith the readily spark-ignitable air-fuel mixture mass, is compressed into a space of diminished volume adjacently to the chamber upper end. Contributing to such segregation and retention of this compressed rotating mass in the upper part of the chamber is the bulbous shape of upper chamber portion 25; i.e., its greater radial dimension relatively to that of the throat 26 to thereby provide space into which such rotating mass is forced radially as it is being vertically flattened. Due to the fluidal character of the entire mass rotating in the bulbous chamber portion 25 about the axis a—a, there will be some interpenetration therein between contiguous surfaces of axially adjacent portions of such mass, so such mass portions will not be separated at cleavage-plane-like boundries. However, migratory vertical movement of the fuel particles in a fuel-containing mass portion adjacently to the chamber end 19 is insufficiently profuse to neutralize the spark-ignitable character of such mass portion before ignition thereof.

Fuel injection, through the injector or nozzle, may occur during the air intake stroke and also during the compression stroke. Alternately, to obtain engine operation at low speed idle or at light load, injection may occur only during the compression stroke. Engine operation is herein described as it would be under control of a fuel supply system in which the injection starting time is varied during the cycle or stroke wherein injection starts, whereas the injection period terminating time within the cycle or stroke wherein injection ends remains constant to incur greater quantities of fuel per injection correlated with respectively earlier injection starting times; that is, the earlier the starting time the greater the injected fuel quantity, irrespective of engine speed. Engine operation is not limited to any particular fuel metering system. For example, the fuel quantity per injection may be varied by changing the delivery rate during injection periods.

Pursuant to each air intake stroke of the engine piston and the resulting expansion of the variable volume space 14, air initially introduced into chamber 10 through the air intake valve 16 and caused to flow from the chamber through the open (lower as viewed in FIG. 1) end thereof into said space is regarded as a leading portion of the introduced air, whereas the air occupying the chamber at termination of space expansion is regarded as a trailing air portion.

To attain maximum or rated load of the engine at any given speed, fuel injection will preferably commence at a predetermined time after though near start of the intake stroke. During this intake stroke the variable volume space 14 will be charged with air entering past the air intake valve 16 and through the combustion chamber 10 from which such air forces contaminant products of the preceding combustion into said space. The fuel which is injected in the form of a conical spray pattern such as S into the chamber will mix with and be borne by the air moving through the chamber into the variable volume space where mixing also occurs with the residual combustion products forced from the combustion chamber. The fuel delivery rate will be such that upon completion of the intake stroke the variable volume space will have been charged with an amount of fuel which, when later supplemented in the combustion chamber by fuel contained in such chamber prior to ignition, will produce maximum power for which the engine is rated at such speed. This amount of fuel in the variable volume space and the air mixed therewith, when compressed into the combustion chamber, will constitute an air-fuel mixture sufficiently rich in fuel to support combustion.

Engine operation at selectable part loads is accomplished by starting fuel injection at respective later times during the air intake stroke, thus incurring less fuel per injection and less power output. With this mode of operation, irrespective of engine load magnitude, fuel injection started before termination of the air intake stroke will continue until start or even after start of the ensuing compression stroke to ensure the presence of fuel in the combustion chamber during the initial part of compression. During the compression stroke when the intake and exhaust valves are both closed, air in the chamber at the beginning of this stroke mixes with fuel contained in the chamber at termination of the preceding intake stroke and with any fuel injected into the chamber during the compression stroke. This air-fuel mixture or mass will be compressed foremost upwardly where it remains in the form of the reliably spark-ignitable air-fuel mass enveloping the electrodes 36 and 37. Ignition will occur at or near termination of the compression stroke.

Now considering what occurs during engine operation under the condition of no-load at idling speed, adequate fuel may be provided by injection starting at or near start of the compression stroke. Injection may continue from a short time prior to or after intake stroke termination and into the compression stroke cycle long enough to ensure there being in the chamber an amount of fuel which when mixed with the chamber-contained air will provide therewith an air-fuel mixture sufficiently rich in fuel to be readily spark-ignitable. This is significant because, as explained above, it is this mixture mass which is compressed foremost upwardly in the chamber to form the readily spark-ignitable mass enveloping the electrodes. At no time during the compression stroke and no-load idling speed operation will there be a significant amount of fuel in the variable space, wherefore the vortex advancing helically upwardly in and through the vestibule will be composed principally of air containing combustion products mixed therewith while in the variable volume space. This vortex rotates and compresses the spark-ignitable air-fuel mixture upwardly into the form of a vertically flattened mass revolving about the chamber axis a—a and enveloping the electrodes where the bulk of such mass remains until ignited. The energy obtained from burning this relatively small amount of fuel will be adequate to support no-load idle speed operation. At the time of ignition, that part of the chamber content below the ignited mass will consist principally of air providing an excess of oxygen for efficient burning of the fuel.

Since the readily spark-ignitable air-fuel mixture is created principally in the precombustion chamber, even during part load and full load operations when such mixture is created subsequent to creation of part load and full load mixtures and while these mixtures are principally in the variable volume space, and said spark-ignitable mixture remains segregated while being compressed into enveloping relation with the electrodes, reliable ignition is assured not only for no-load idle operation but also for part load and full load operations without incurring a problem of over-rich fuel mixture enveloping the electrodes at these increased loads.

The whirling motion of the spark-ignitable mass about the chamber axis a—a causes initially-ignited fuel to be borne circularly about the chamber to augment radial spreading of the flame front from the electrodes, thereby diminishing the time for complete burning of the fuel. The time for complete burning of the fuel is also diminished by this whirling air conducting fuel particles toward the spark-emitting electrodes. Hence the fuel burning process performed in and with this combustion chamber structure involves a character of air-fuel mixture control and movement for attaining desired rapid fuel burning heretofore recognized as being attainable by intense turbulence without regard to motion direction of different parts composing the turbulent mass.

The power stroke is effected by the burning fuel which establishes a flame front originating at and spreading from the electrodes 36 and 37 to increase the temperature and pressure in the conbustion chamber, thereby forcing the resulting hot gases through the vestibule 24 into the variable volume space to force the piston downwardly. During the ensuing exhaust stroke, products of the combustion incurred during the power stroke will be exhausted past the exhaust valve en route to the atmosphere. Those combustion products in chamber 10 will remain captive there during the exhaust stroke, to be later recycled as explained above.

FIG. 3 illustrates two additional embodiments of the invention having respectively different contours for their combustion chamber interior peripheries. The first of these additional embodiments is shown in solid lines and the parts thereof corresponding to parts of the FIGS. 1 and 2 embodiment are designated by the same respective reference characters plus the suffix letter "a" to avoid duplicative description of their identity and function. The first of these additional embodiments departs in structure from the FIGS. 1 and 2 structure in the respect of eliminating the chamber throat portion 26 and by having a vestibule portion 24a with an interior periphery 21a of substantially cylindrical shape. Some simplification of structure is thus obtained relatively to the FIGS. 1 and 2 embodiment.

The second of these two additional embodiments differs from the first thereof only in the respect that the chamber inner periphery 21b thereof conforms to that shown by the dot-dash lines. The main chamber portion 25b of this embodiment is vertically flatter than chamber portion 25a. Also, that portion of chamber periphery 21b of vestibule 24b of this embodiment converges upwardly away from the chamber open lower end toward the chamber axis to incur radial contraction of a vortex that flows upwardly in the vestibule.

Because of being part of the main air intake passage, the precombustion chamber while being shaped to obtain a stratum of air-fuel mixture must minimize resistance to air flow therethrough. To attain this characteristic in the FIG. 1 species the outer girth of the central space of radius R is substantially equal to or 100 percent of the chamber inner periphery minimum girth, at the throat 26. In the solid line version of FIG. 3 the central space outer girth is approximately 50 percent of the chamber minimum girth which is in the vestibule 24a, whereas in the dot-dash line version the central space outer girth is approximately 70 percent of the chamber minimum girth which is in the vestibule 24b. Another criteria related to air flow capacity of the prechamber is the relation of this chamber's minimum inner periphery girth to the value seat girth. In the FIG. 1 species the inner periphery minimum girth which is at the throat 26 is approximately 58 percent of the valve seat girth. Less than 50 percent would impose severe restriction on the amount of air delivered through the air inlet passage into the engine cylinder. In the solid line version of FIG. 3 the chamber inner periphery minimum girth which is in the vestibule 24a is approximately 97 percent of the valve seat girth, whereas in the dot-dash line version the inner periphery minimum girth which is in the vestibule 24b is approximately 73 percent of the valve seat girth.

I claim:

1. An internal combustion engine having a main air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with the upstream passage portion and of which ends the other is an open end in juxtaposed two-way open communication between said space and the interior of the chamber, the transverse area of such open end being substantially less than the transverse area of the cylinder, the chamber having, adjacently to its air inlet end, a main portion with a radially inwardly-facing periphery of girth about said axis exceeding that of the valve seat, a portion of the chamber adjacently to said open end constituting a vestibule of the chamber with a radially inwardly-facing periphery surrounding said axis, a portion of the main chamber portion periphery nearest to the vestibule being convergent toward the vestibule and toward said axis, the vestibule having therein a central substantially unobstructed space contiguously enveloping the chamber axis and in radially inwardly-spaced relation from the vestibule periphery, said central space accommodating substantially unobstructed flow of air or gas therethrough, via the chamber open end, between the variable volume space and the chamber main portion, and air deflecting means disposed captively in the vestibule between the central space and the vestibule periphery, such air deflecting means being configured to operate cooperably with the vestibule periphery to effect helical motion, about the chamber axis, to air contacting such air deflecting means pursuant to such air flowing from the variable volume space through the vestibule en route to the chamber main portion for compression therein, means for admitting fuel into the chamber main portion to coexist with air compressed therein in the form of an ignitable air-fuel mixture, and fuel igniting means in such chamber main portion for igniting said mixture.

2. The combination set forth in claim 1, wherein the air deflecting means comprises air deflecting vanes projecting from the vestibule periphery in cantilever fashion, and said vanes being spaced apart circumferentially about said axis and having air deflecting surfaces disposed to slant helically about and axis.

3. The combination set forth in claim 1, wherein at least a portion of the vestibule inwardly-facing periphery is convergent axially away from the chamber open end and toward said axis.

4. The combination set forth in claim 3, wherein the air deflecting means comprises air deflecting vanes projecting from the vestibule periphery in cantilever fashion, and said vanes being spaced apart circumferentially about said axis and having air deflecting surfaces disposed to slant helically about said axis.

5. An internal combustion engine having a main air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having an air inlet valve seat surrounding said axis and through which the chamber is communicative with the upstream passage portion and of which ends the other is an open end in juxtaposed two-way open communication between said space and the interior of the chamber, the transverse area of such open end being substantially less than the transverse area of the cylinder, the chamber having, adjacently to its air inlet end, a main portion with a radially inwardly-facing periphery of girth about said axis exceeding that of the valve seat, a portion of the chamber adjacently to said open end constituting a vestibule of such chamber with a radially inwardly-facing periphery surrounding said axis, the chamber having, between said main portion and said vestibule, a throat portion with a radially inwardly-facing periphery of less girth about said axis than that of the main chamber portion and that of the vestibule, at least a portion of the main chamber periphery adjacently to the throat portion being convergent toward and to said throat portion and toward said axis, the vestibule having therein a central substantially unobstructed space contiguously enveloping the chamber axis and in radially inwardly-spaced relation with the vestibule periphery, said central space accommodating substantially unobstructed flow of air or gas therethrough, via the chamber open end, between the variable volume space and the chamber main portion, and air deflecting means disposed captively in the vestibule between said central space and the vestibule periphery, such air deflecting means being configured to operate cooperably with the vestibule periphery to effect helical motion, about the chamber axis, to air contacting such air deflecting means pursuant to such air flowing from the variable volume space through the vestibule en route to the chamber main portion for compression therein, means for admitting fuel into the chamber main portion to coexist with air compressed therein in the form of an ignitable air-fuel mixture, and fuel igniting means in such chamber main portion for igniting said mixture.

6. The combination set forth in claim 5, wherein the air deflecting means comprises air deflecting vanes projecting from the vestibule periphery in cantilever fashion, and said vanes being spaced apart circumferentially about said axis and having air deflecting surfaces disposed to slant helically about said axis.

7. The combination set forth in claim 5, wherein a portion of the vestibule periphery, adjacently to the throat portion, is axially convergent toward the throat portion and toward said axis.

8. The combination set forth in claim 7, wherein th air deflecting means comprises air deflecting vanes projecting from the vestibule periphery in cantilever fashion, and said vanes being spaced apart circumferentially about said axis and hving air deflecting surfaces disposed to slant helically about said axis.

9. An internal combustion engine having a main air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with the upstream passage portion and of which ends the other is an open end in juxtaposed two-way open communication between said space and the interior of the chamber, the transverse area of such open end being substantially less than the transverse area of the cylinder, the chamber having a radially inwardly-facing periphery, the chamber also having, adjacently to its air inlet end, a main portion including a portion of said periphery and of girth about said axis exceeding that of the valve seat, a portion of the chamber adjacently to its open end constituting a vestibule of such chamber and including another portion of the chamber periphery, the vestibule having therein a central substantially unobstructed space contiguoustly enveloping the chamber axis in radially inwardly-spaced relation from the vestibule portion of said periphery and having a minimum radially outer girth transversely about said axis of at least 50 percent of the correspondingly-taken minimum girth of the chamber inwardly-facing periphery, said central space accommodating substantially unobstructed flow of air or gas therethrough, via the chamber open end, between the variable volume space and the chamber main portion, and air deflecting means disposed in the vestibule between said periphery portion thereof and said central space, said air deflecting means being configured to operate cooperably with the vestibule periphery portion to effect helical motion, about the chamber axis, to air contacting such air deflecting means pursuant to such air flowing from the variable volume space through the vestibule en route to the chamber main portion for compression therein, means for admitting fuel into the chamber main portion to coexist with air compressed therein in the form of an ignitable air-fuel mixture, and fuel igniting means disposed contiguously with the main chamber portion periphery for envelopment by a portion of said mixture and operable to ignite the same.

10. The combination set forth in claim 9, wherein the air deflecting means comprises air deflecting vanes projecting from the vestibule periphery in cantilever fashion, and said vanes being spaced apart circumferentially about said axis and having air deflecting surfaces disposed to slant helically about said axis.

11. The combination set forth in claim 9, wherein a portion of the vestibule inwardly-facing periphery is convergent axially away from the chamber open end and toward said axis.

12. The combination set forth in claim 11, wherein the air deflecting means comprises air deflecting vanes projecting from the vestibule periphery in cantilever fashion, and said vanes being spaced apart circumferentially about said axis and having air deflecting surfaces disposed to slant helically about said axis.

13. An internal combustion engine having a main air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet and having a valve seat surrounding said axis and through which the chamber is communicative with the upstream passage portion and of which ends the other is an open end in juxtaposed two-way open communication between said space and the interior of the chamber, the transverse area of such open end being substantially less than the transverse area of the cylinder, the chamber having a radially inwardly-facing periphery, the chamber also having, adjacently to its air inlet end, a main portion including a portion of said periphery of girth about said axis exceeding that of the valve seat, a portion of the chamber adjacently to its open end constituting a vestibule of such chamber and including another portion of the chamber periphery, the vestibule accommodating flow of air or gas therethrough, via the chamber open end, from the variable volume space into the chamber main portion for compression therein, means for admitting fuel into the chamber main portion to coexist with air compressed therein in the form of an ignitable air-fuel mixture, and fuel igniting means disposed contiguously with the main chamber portion periphery for envelopment by a portion of said mixture and operable to ignite the same, the chamber comprising, exclusively within the vestibule thereof, air deflecting vanes projecting in cantilever fashion radially from the vestibule portion of said periphery into the vestibule, said vanes being spaced apart circumferentially about the chamber axis and having at least portions thereof slanted helically about said axis.

14. The combination set forth in claim 13, wherein a portion of the chamber inwardly-facing periphery within the vestibule and nearest to the chamber main portion is axially convergent away from the chamber open end and toward said axis.

15. The combination set forth in claim 13, wherein the minimum girth of the vestibule periphery portion is at least 50 percent of the valve seat girth.

16. The combination set forth in claim 15, wherein a portion of the vestibule periphery portion and nearest to the chamber main portion is axially convergent away from the chamber open end and toward said axis.

17. The combination set forth in claim 13, wherein the volumetric capacity of the vestibule chamber portion is at least 70% of the volumetric capacity of the main chamber portion.

18. The process of forcing air into and compressing such air in an engine precombustion chamber constituting a section of an air inlet passage communicating with a variable volume space within a cylinder of such engine and said chamber being disposed serially between said space and an upstream portion of the passage, the chamber having opposite ends spaced apart endwise of a principal axis thereof and through one of which ends a principal portion of the chamber adjacently to such end is communicative through an air inlet valve with the upstream passage portion, and the chamber also having adjacently to its other end a vestibule surrounding said axis and communicating axially through an open end thereof in such other end between the variable volume space and said principal portion of the chamber, the transverse area of such open end of the vestibule being substantially less than the transverse area of the cylinder, said process comprising the step of forcing from said space axially of the chamber through said open end into and through the vestibule into the principal chamber portion an air stream composed of a central portion contiguously embracing said axis and a peripheral portion contactively surrounding the central portion radially outwardly from said axis, the step of imparting helical motion about said axis to the peripheral portion of the stream relatively to the central portion thereof while the stream portions are in the vestibule and the further step of progressively diminishing the girth of the air stream as it approaches the main chamber portion.

19. A process as set forth in claim 18, wherein there is the further step of incurring radial expansion of at least the peripheral portion of said stream attendant to it entering said main chamber portion.

20. A process as set forth in any one of claims 18 and 19, wherein the air inlet passage, of which the precombustion chamber constitutes a section, is a main air inlet passage for and communicating with the variable volume space.

21. The process of forming a mass of air-fuel mixture and an adjoining mass of air containing, at most, less fuel per unit of air than in said mixture all within an engine precombustion chamber having opposite ends spaced apart endwise of a principal axis of the chamber and through an open one of which ends the chamber communicates endwise with an alternately expandable and contractable variable volume space in a cylinder of such engine, and the chamber having an interior periphery facing radially inwardly toward said axis, said process comprising a step, occurring during expansion of said space, of introducing into the chamber air consisting of a leading portion which is caused to flow through the chamber and the open end thereof into said space and also consisting of a trailing portion which occupies the chamber at termination of such space expansion, a step, occurring subsequent to start of entry of the air leading portion into said space, of introducing fuel into the chamber in such quantity and timed relatin with the expansion and ensuing contraction of said space as to coexist in mixed relation with said trailing air portion to constitute a spark ignitable air-fuel mixture therewith, and, during said ensuing contraction of said space, directing flow from such space of air consisting of at least part of said leading air portion reversely through the chamber open end axially into the chamber in the form of a stream comprising a central portion contiguously embracing said axis and a radially outer peripheral portion in contact with the chamber inwardly-facing periphery, the step of controlling the composition and motion of parts of said stream to incur compression of the spark ignitable mixture into a concentrated mass adjacently to the other end of the chamber attendant to disposing said stream to form said adjoining air mass adjacently to the chamber open end and the further step of initiating ignition of said mixture within said concentrated mass thereof and adjacently to said other end of the chamber.

22. A process as set forth in claim 21, wherein the composition and motion controlling step involves imparting helical motion to the peripheral stream portion about the chamber axis relatively to the central stream portion.

23. A process as set forth in claim 21, wherein the chamber is a section of a main air intake passage for said space and is disposed serially between said space and an upstream portion of the passage, and the chamber being communicative with the upstream passage portion through an air intake valve having a valve seat surrounding said axis in the chamber other end, and wherein said introduction of the leading end trailing air portions occurs through said valve seat.

24. A process as set forth in claim 23, wherein the composition and motion controlling step involves imparting helical motion to the peripheral stream portion about the chamber axis relatively to the central stream portion.

25. The process as set forth in claim 23, wherein the introduction of fuel is by means of injection.

26. The process as set forth in claim 25, wherein the fuel is injected directly into the chamber.

27. An internal combustion engine cylinder head for assembly with a cylinder of such engine and containing a main air inlet passage including an upstream section and a downstream section constituted by a precombustion chamber having a main portion contiguous with said upstream section and an open center vestibule communicating endwise through an open center end thereof at a face of such head with a variable volume space in the cylinder when the head is so assembled, the chamber main portion and said vestibule therefor intercommunicating through a juncture therebetween, the passage including a poppet valve seat interposed and communicative between the upstream passage section and the main chamber portion, the main chamber portion having an axis surrounded by said seat and also by an inwardly-facing periphery of said chamber portion, the inwardly-facing periphery having a section of maximum girth about the axis that exceeds the girth of said seat about such axis, said inwardly-facing periphery being contractively convergent axially from the maximum girth section thereof to said juncture between the main chamber portion and the vestibule, the vestibule having a periphery facing inwardly toward the open center thereof, and air deflecting means disposed upon such periphery of the vestibule and projecting inwardly thereof a distance limited to minimize obstruction of the vestibule's open center, said air deflecting means being cooperable with the vestibule periphery to direct air entering the passage contiguously with such periphery from the variable volume space into the main chamber portion helically about said axis, the main chamber portion being receptive of fuel to coexist with air therein to form therein a spark-ignitable air-fuel mixture, and the chamber having a sidewall portion configured to receive and retain a unit with fuel-igniting electrodes exposed in said chamber portion.

28. The combination set forth in claim 27, wherein a portion of the vestibule periphery tapers contractively toward said juncture with the main chamber portion and toward said axis.

* * * * *